Feb. 23, 1971  J. LA RUSSA  3,565,539
COLLIMATED SIGHT
Filed June 12, 1967  5 Sheets-Sheet 1
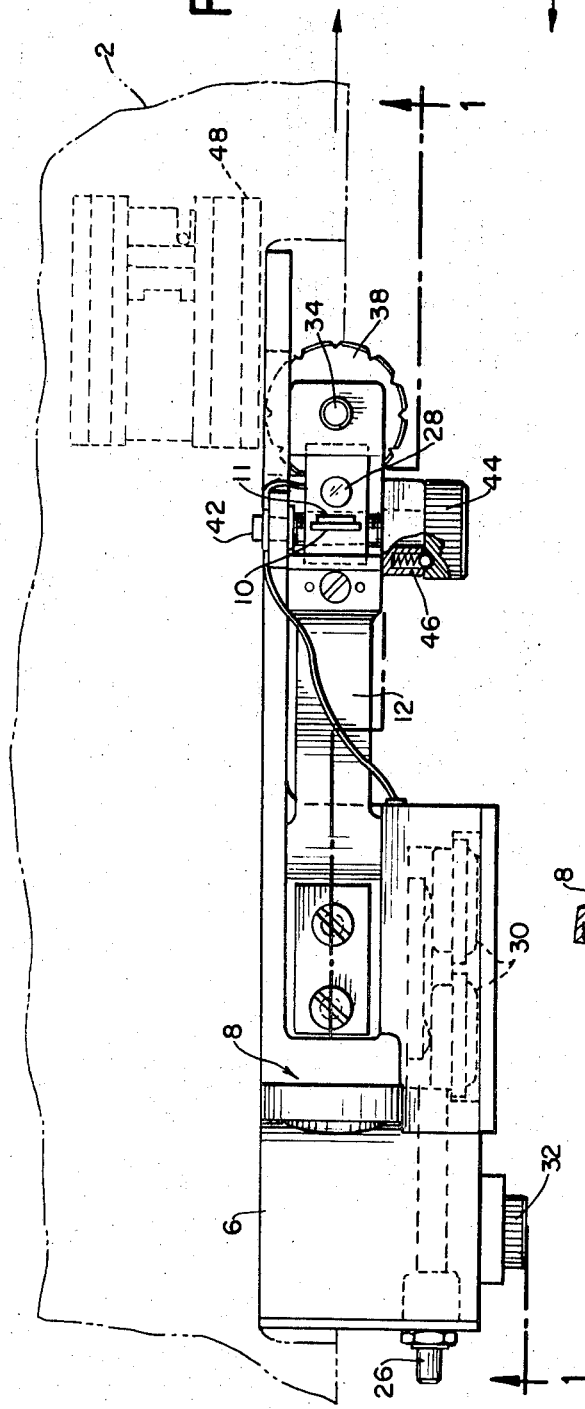
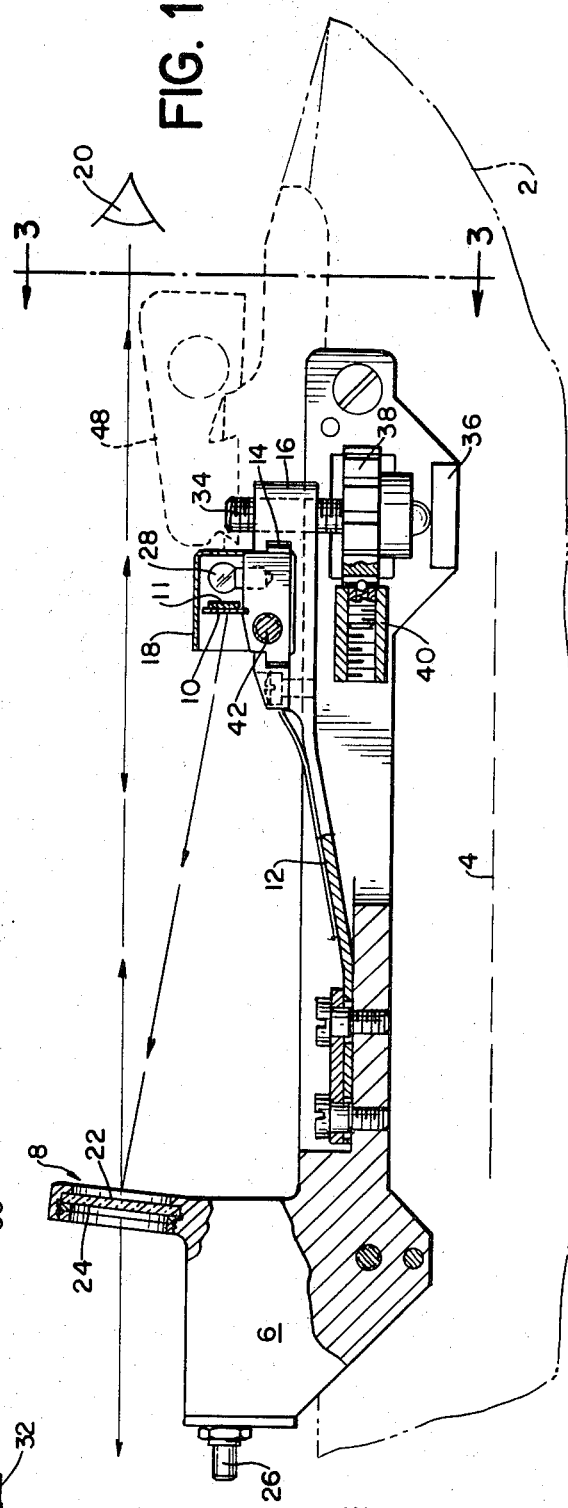
INVENTOR
JOSEPH LaRUSSA
BY Pennie Edmonds Morton,
Taylor and Adams
ATTORNEYS Feb. 23, 1971  J. LA RUSSA  3,565,539
COLLIMATED SIGHT
Filed June 12, 1967  5 Sheets-Sheet 2
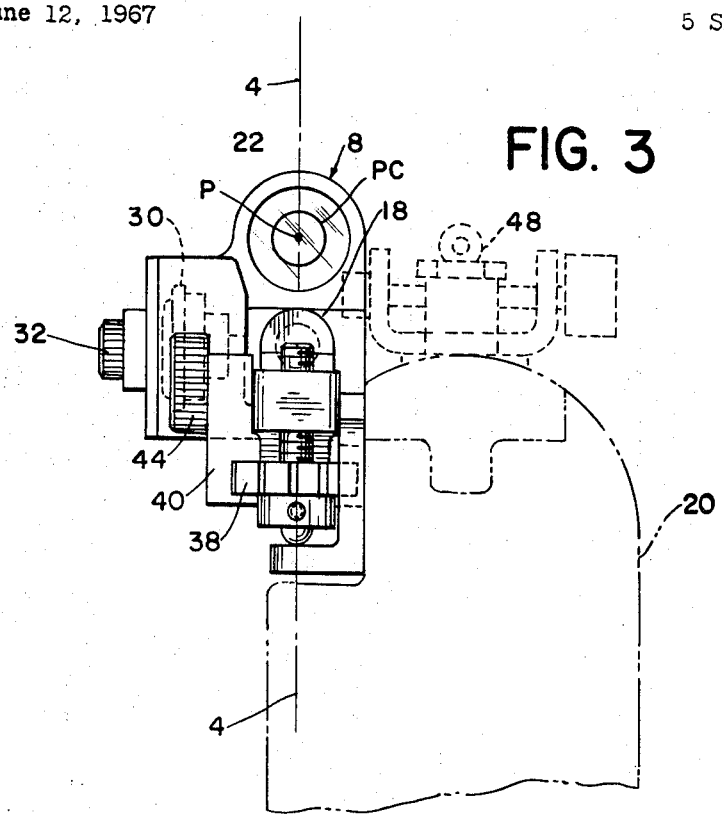
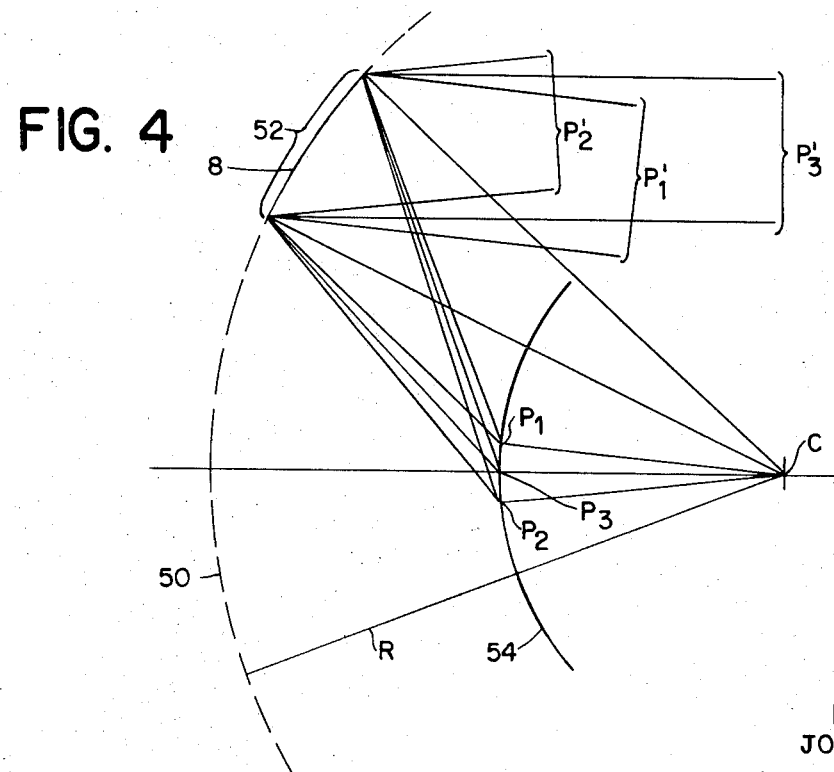
INVENTOR
JOSEPH LaRUSSA
BY Pennie, Edmonds, Morton,
Taylor and Adams
ATTORNEYS

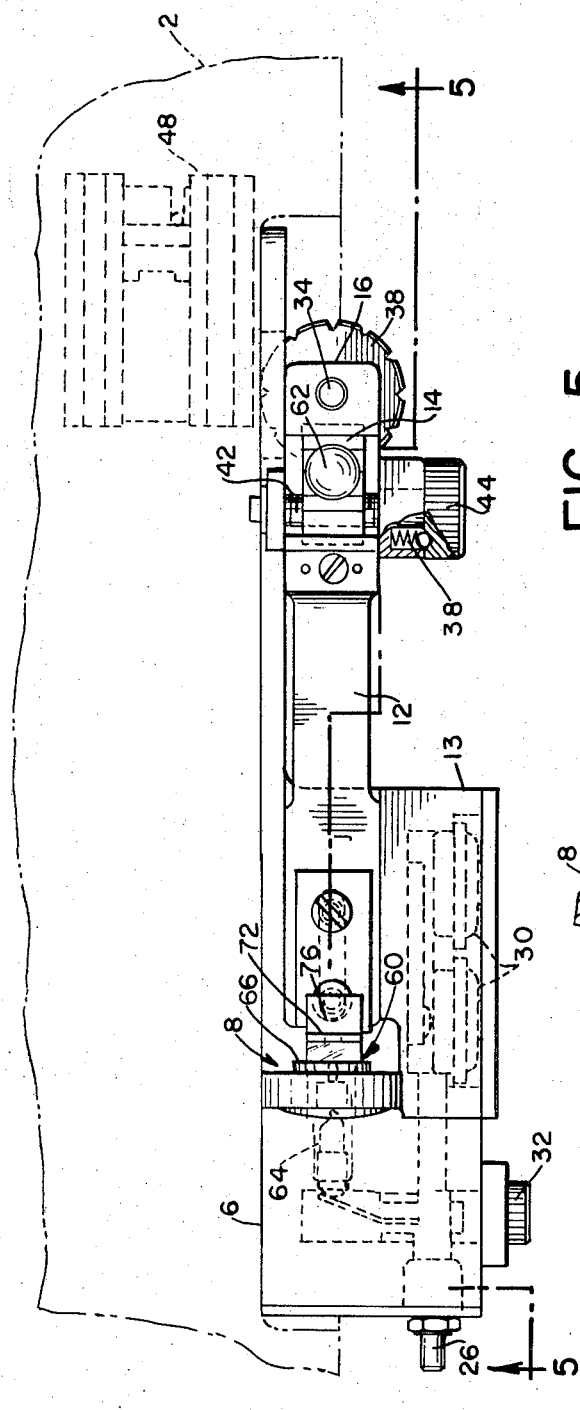
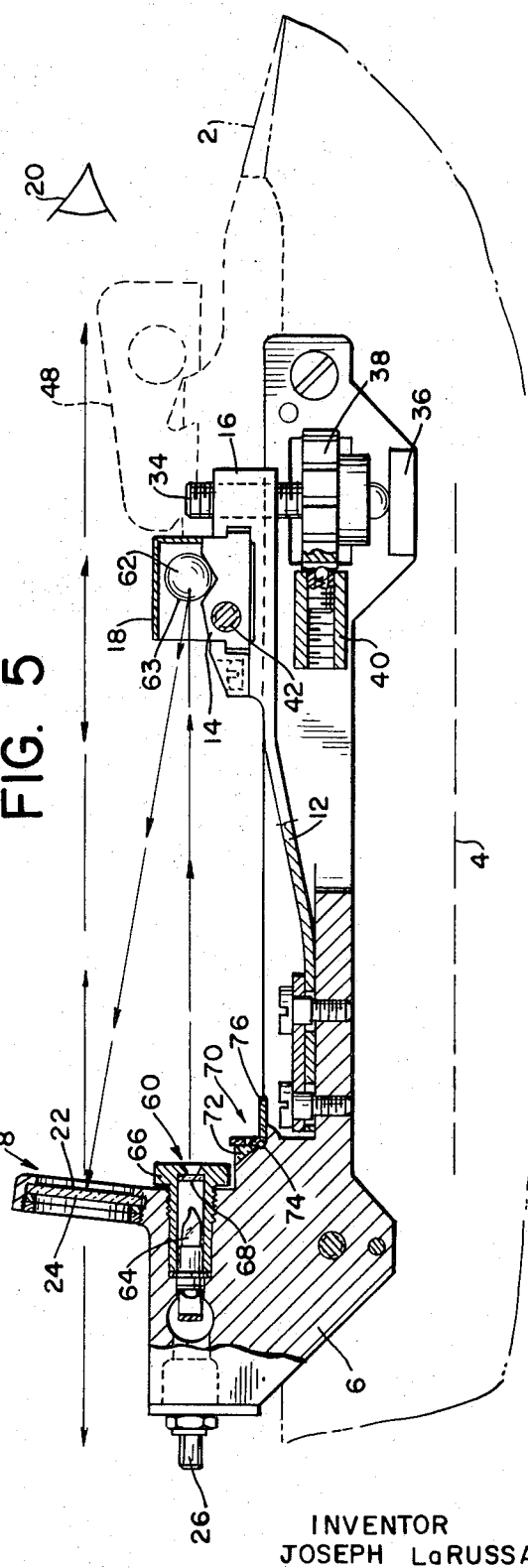

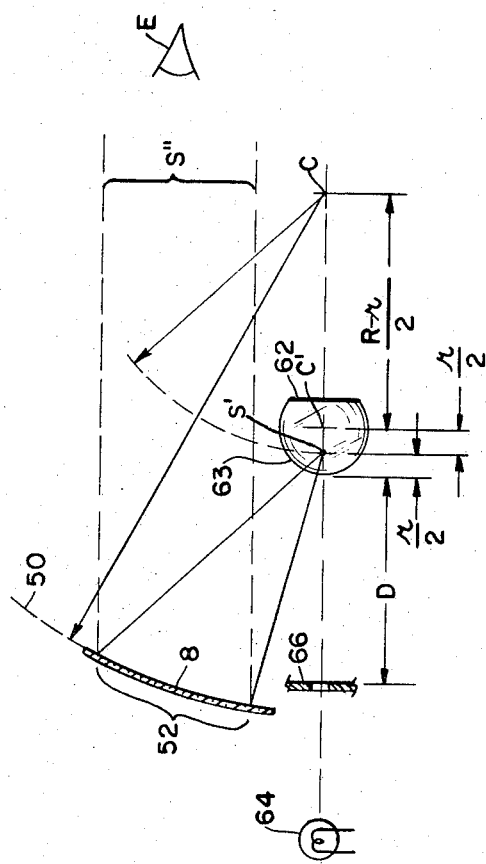
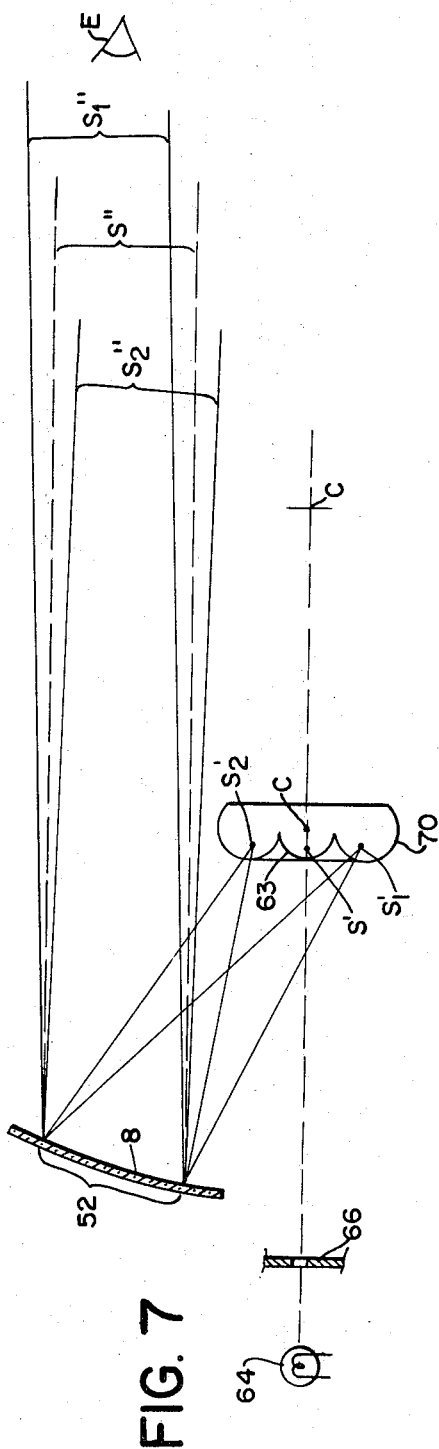

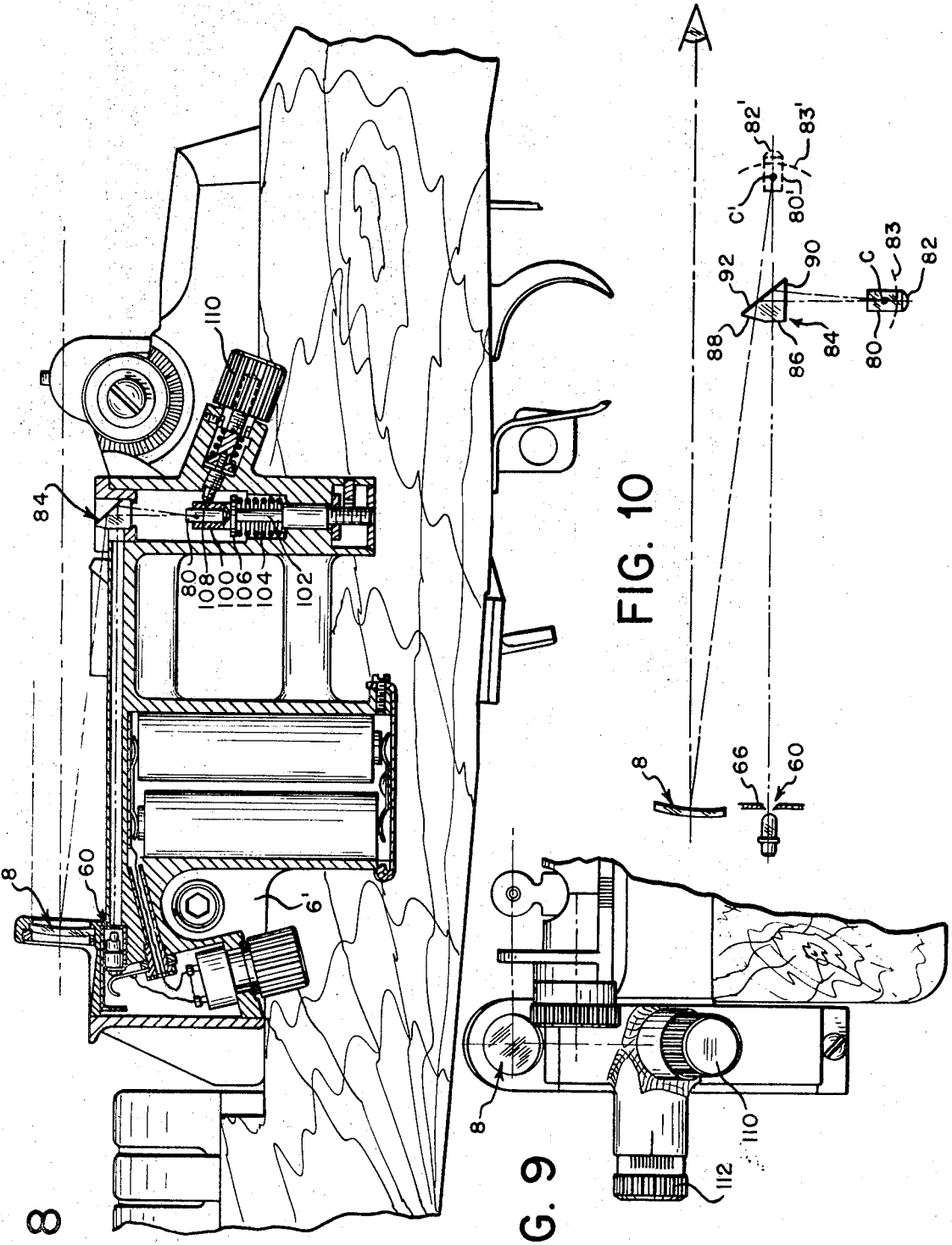

3,565,539
Patented Feb. 23, 1971

3,565,539
COLLIMATED SIGHT
Joseph La Russa, Yonkers, N.Y., assignor to Farrand Optical Co., Inc., Bronx, N.Y., a corporation of New York
Filed June 12, 1967, Ser. No. 645,160
Int. Cl. G02b 23/10, 27/34
U.S. Cl. 356—251                              3 Claims

ABSTRACT OF THE DISCLOSURE

There is disclosed a sight, for use for example on a firearm, which employs a partially reflecting concave mirror to present to the user by means of collimated light an image at infinity of an aiming pattern such as a luminous dot or circle, superimposed on the field of view as seen unaltered through the concave mirror. The aiming pattern is disposed on the focal surface of the concave mirror, and in one embodiment taken the form of a minified image, real or virtual, of an aiming pattern established elsewhere. The minified image is generated by a curved reflecting surface positioned to have its focal surface on the focal surface of the concave mirror.

BACKGROUND OF THE INVENTION

Field of the invention

The present invention relates to sighting devices, for example for use on firearms, and more particularly to sighting devices which define a line of sight by means of collimated light, presenting to the user an image at infinity of an aiming pattern which he superposes on the target of his choice.

BACKGROUND OF THE INVENTION

Sighting devices of this general character have been proposed heretofore, but those with which I am familiar have employed telescopic lens systems, requiring objective and eyepiece lenses and having among others the disadvantage of requiring the user to position his eye at the exit pupil of the telescope.

SUMMARY OF THE INVENTION

The present invention instead employs, to produce at infinity an image of an aiming pattern, a partially transparent concave mirror in which the user sees that image and through which he sees simultaneously, without angular magnification or minification, the field of view on which he is sighting. It also employs, as an object to be so imaged by the concave mirror, aiming pattern defining means disposed at the focal surface of the concave mirror. These means may take the form of a real object such as an illuminated reticle pattern, or they may take the form of an image, real or virtual of such a pattern defined elsewhere and imaged with minification at the focal surface of the concave mirror by a curved reflecting or refracting surface or surfaces whose own focal surface coincides with that of the concave mirror.

The invention will now be further described in terms of a number of presently preferred exemplary embodiments and by reference to the accompanying drawings, in which:

FIG. 1 is a view in side elevation of one embodiment of the invention;

FIG. 2 is a plan view of the apparatus of FIG. 1;

FIG. 3 is a sectional view in end elevation taken on the line 3—3 of FIG. 1;

FIG. 4 is an optical diagram useful in explaining the embodiment of FIG. 1;

FIG. 5 is a view similar to that of FIG. 1 but showing another embodiment of the invention;

FIG. 5a is a plan view of the apparatus of FIG. 5;

FIG. 6 is an optical diagram useful in explaining the embodiment of FIG. 5;

FIG. 7 is an optical diagram similar to FIG. 6 but illustrating still another embodiment;

FIG. 8 is a view similar to that of FIG. 1 but showing still another embodiment;

FIG. 9 is a sectional view taken on the line 9—9 of FIG. 8; and

FIG. 10 is an optical diagram useful in explaining the embodiment of FIGS. 8 and 9.

DESCRIPTION OF THE PREFERRED EMBODIMENTS

FIG. 1 shows an embodiment of the invention mounted on a firearm and which employs an illuminated reticle plate 10 located substantially on the focal surface of a concave combining mirror 8, with means to raise and lower the reticle plate for adjustments in range, and means to shift the reticle plate horizontally in order to effect windage adjustments. In FIG. 1, reference character 2 denotes the stock of a firearm. The dash line 4 represents (i.e. is a line parallel to) the axis of the gun barrel or barrels, not shown, which may be either rifled or smooth bore. A mounting plate 6 is fixed in position with respect to the barrel. It may be, for example, fastened to the barrel by way of the receiver of the firearm.

The mounting plate supports in fixed position thereon a concave combining mirror generally indicated at 8, and it supports an illuminated reticle plate 10 via a spring arm 12 susceptible of flexure about an axis perpendicular to the plane of FIG. 1 and a slide 14 susceptible of motion transverse of that plane with respect to a block 16 mounted at the free end of the spring arm. The plane of FIG. 1 is normally vertical in the use of the firearm. The reticle plate may be provided with a hood 18.

The combining mirror 8 has a concave face 22, for example spherical, partially silvered so as to be partially transmitting and partially reflecting of visible light. The other face 24 of the mirror, conveniently made of glass, is preferably rendered non-reflecting by the application of a coating thereto of the type well-known under the term "coated optics."

A switch 26 controls illumination of the reticle plate 10 from an incandescent lamp 28 housed behind the plate 10 and behind a plate 11 of opal glass or similar light diffusing material. The plate 10 is coated with opaque material in which the aiming pattern appears as a transparent pattern, for example in the form of a circle with a dot at the center. For a concave mirror 8 having a spherical surface 22 of, say, 8 inches radius of curvature, the diameter of the circle of the reticle pattern on plate 10 may be of the order of 0.1 inch. Conductors for the lamp may pass down the spring arm to a circuit including the switch 26, batteries 30 (FIG. 2) and a rheostat controlled by a knob 32 (FIG. 2) for adjustment of the brightness of the reticle pattern.

For the elevation or range adjustment, a screw 34 is threadedly engaged in the block 16 and rests at one end, for all positions of the screw in the block, against an abutment 36 affixed to the plate 6. The screw 34 may be rotated by a handwheel 38, cooperating with a detent mechanism 40 on or attached to the plate 6.

The windage adjustment includes a screw 42 threadedly engaging the slide 14 and fixed against translation but free for rotation with respect to the block 16. A windage adjustment knob 44 is fastened to this screw and may be seen in FIG. 2. It similarly engages with a detent mechanism 46 mounted on the block 16.

3

The sight of the invention may be mounted on a firearm without disturbing the normal sighting mechanism thereof, and in the plan view of FIG. 2 the usual rear sight of the firearm is diagrammatically shown at 48.

FIG. 3 shows the sight of FIGS. 1 and 2 as seen by the user of the firearm. He looks through the window provided by the semi-transparent concave mirror 8 and, to aim the firearm, he simply superposes the reticle pattern as seen by him in that window on the target of his choice. The reticle pattern is shown in FIG. 3 as a circle PC with a dot P at its center, but it may of course have any other form, such as a plain circle or merely a dot. The pattern indicated at PC and P in FIG. 3 is the image at infinity, produced by the concave mirror 8, of the illuminated pattern of recticle plate 10.

Since the image of the reticle which the shooter looks at is at infinity, like the target itself, the shooter is under no necessity of shifting the focus of his eye between a target at infinity and one or more elements of a sight which are close to but at different distances from him, such as the usual front and rear sights of a set of open sights on a gun. The same advantage is available with a telescopic sight, which however is more complicated than the sight of the invention, requiring an objective or eyepiece and a tube in which to fit them. A telescope sight also requires relatively accurate placing of the shooter's eye at the exit pupil of the telescope if he is to see anything through the sight, and unless built at unity magnification it reduces the insantaneous field of view available to the shooter. Even when a telescopic sight is constructed at unity magnification, the telescope tube occults a part of the field around the target, in addition to requiring accurate positioning of the shooter's eye at the exit pupil of the telescope, as already mentioned.

The mode of operation of the sight of FIGS. 1 to 3 will clear from a consideration of FIG. 4. In that figure, the circular arc 50 represents, extended, the trace of the combining mirror 8 (i.e. of its concave surface 22), in a plane containing the center of curvature thereof. Hereinafter, the term combining mirror will, unless otherwise stated, refer to the partially reflecting concave surface thereof. The plane of FIG. 4 is that indicated by the line 4—4 in FIG. 3.

In FIG. 4, that part 52 of the arc 50 shown in full line represents the physical mirror 8. It may for example have an angular extent of four or five degrees, subtended at its center of curvature C. In FIG. 4 the circular arc 54, concentric with the arc 52 and having a radius one-half the radius R of arc 52, represents the focal surface of the mirror 8.

$P_1$ and $P_2$ represent two points on the reticle pattern at the plate 10, e.g., two diametrically opposite points on a circle forming part of that pattern. The light diverging from $P_1$ which falls on the mirror 8 is transformed into a parallel bundle $P_1'$ while the light diverging from point $P_2$ is transformed by the mirror into a parallel bundle $P_2'$, the angular separation of the two bundles being the same as the angle subtended at C by the portion of the arc 54 between points $P_1$ and $P_2$. If the reticle pattern generated at plate 10 includes a central aiming dot, assumed for convenience of illustration to be a geometrical point as shown at $P_3$ in FIG. 4, then the light diverging from $P_3$ and falling on the mirror 8 will be transformed into a parallel bundle $P_3'$. The bundles $P_1'$, $P_2'$ and $P_3'$ are parallel to the lines $CP_1$, $CP_2$ and $CP_3$ respectively.

Hence, to establish a line of sight parallel to the axis of the gun barrel, it is only necessary to provide that the reticle pattern include a dot such as $P_3$ ad to locate the reticle plate so that the line $CP_3$ between the center of curvature C of the concave mirror and the dot $P_3$ is parallel to the axis of the gun barrel.

The calibration of the range and windage adjustments

4 in the sight of FIGS. 1 to 3 may be set up accordingly, although it may also be done empirically.

It is to be noted that to elevate the gun barrel the reticle plate must be lowered, whereas with the usual mechanical sights the rear sight of a gun is raised to elevate the gun. Similarly, if the gun barrel is to point to the right of the line of aiming sight, to compensate for wind from the right, the reticle plate must be moved to the left for the shooter looking down the gun barrel from the breech to the muzzle. With the usual mechanical sights, the rear sight would be moved to the right to compensate for wind from the right.

For clarity of the diagram in FIG. 4, the angular size of the mirror 8 shown at 52 (i.e., the angle subtended thereby at the center C) has been exaggerated, as has been the angular displacement of the object points $P_1$, $P_2$ and $P_3$ from the mean direction between C and that mirror. While some spherical aberration of course exists, it is in practice not troublesome, and is much less than the angles employed for purposes of illustration in FIG. 4 would suggest.

FIG. 5 illustrates another embodiment of the invention which differs from that of FIGS. 1 to 3 in that in place of the reticle plate 10 on the focal surface of the concave mirror 8 the embodiment of FIG. 2 employs a light source generally indicated at 60, stationarily mounted on the plate 6, and a small reflective ball 62 on the slide 14. The ball may for example be of stainless steel, but it need not be a complete sphere. A hemisphere bounded by a plane approximately perpendicular to the gun barrel axis 4 is ample. The ball presents to the source 60 a reflecting spherical surface 63 which constitutes a second curved mirror, additional to the first curved mirror 8.

The source 60 comprises a lamp 64, controlled by a switch 26 and a rheostat as in the embodiment of FIGS. 1 to 3, a plate 66 having a small aperture therein and a light diffusing plate 68 between the lamp and aperture. The source is positioned so that the light path between it (i.e., between the aperture in plate 66) and the ball 62 is approximately parallel to the gun barrel axis 4, but this is not critical.

The ball 62 is positioned to locate the focal surface of the reflective surface 63 thereof substantially on the focal surface of the concave mirror 8. In consequence, the surface 63 forms, on its own focal surface, inside the ball, a virtual image of the source 60, and this virtual image is re-imaged at infinity by the concave mirror 8. The distance between the source 60 and the adjacent vertex of the surface 63 is large compared to the distance between that vertex and the focal surface of the ball, i.e., compared to the half radius of the ball, so that the virtual image of source 60 is much reduced in linear dimensions compared to the diameter of the opening in plate 66.

FIG. 6 constitutes an optical diagram similar to that of FIG. 4, but showing the optically important elements of the embodiment of FIG. 5. The mirror 8 is represented in FIG. 6 again by a solid line portion 52 of a circular arc 50 with its center at C. The ball is shown at 62, exaggerated in size for clarity, and is shown as an incomplete sphere as it may be. It is positioned so that its own focal surface, at a distance half-way between its center and its surface 63, lies substantially on the focal surface of the mirror 8. Thus, if the radius of surface 63 is $r$, the ball is positioned with its center $C'$ at a distance $R/2 - r/2$ from the center of curvature C of mirror 8.

The apertured plate 66 is positioned distant from the ball 62 by a distance D which is large compared to $r/2$. Thus for example the distance D may be 3" and $r/2$ may be 0.062". With such a relation between the distances D and $r/2$, the effect of the ball 62 is to present to mirror 8, as an object to be imaged thereby at infinity, a virtual image S' of the light source represented by the aperture in plate 66, this virtual image S' being reduced in linear dimensions by a factor of $2D/r$ by comparison with the source. Let this source be called S. Thus, if the diameter of the hole in plate 66 is 0.031" for example, $S=0.031"$ and $$S' = \frac{r}{2D} S = 0.0006"$$

The virtual image S' is reimaged by the concave mirror at infinity, as indicated in FIG. 6 by the bundle of collimated light S". The bundle S" shown in FIG. 6 implies that the virtual image S' is a geometrical point. Of course this is not true. The image S' has a finite size, as above indicated, so that the separate points thereof give rise to separate collimated bundles based on the mirror 14. The angular divergence among these bundles is small however. In the example above indicated with $D=3"$, $S=0.031"$ and $r=0.124"$ giving $S'=0.006"$, if $R=6"$, the angle subtended at the observer's eye at 20 by the image seen by him is only $3 \times 0.0006 = 0.002$ radians, or approximately seven tenths of one minute of arc.

Thus the apparent size of the spot projected by the sight is less than one minute of arc, which is below the resolution capability of the human observer.

FIG. 5 shows, in addition to the source 60, an alternate source generally indicated at 70. The source 70 comprises a reflecting prism 72 and a vertical plate 74 having a small aperture therein facing the ball 62. The prism 72 has two perpendicular faces through which light enters and emerges from the prism and a reflecting face at 45° to those perpendicular faces. Ambient light enters the prism through the top face in FIG. 5 and passes out to the right through the aperture in plate 74.

The source 70 is displaced, crosswise of the gun axis 4, from the source 60 by a distance which is small compared to the separation D (FIG. 6) between the source 60 and the ball, and it is at approximately the same distance from the ball as source 60. Hence the reflecting surface 63 on the ball forms a virtual image of the source 70 which is only slightly displaced from the virtual image which it forms of the source 60. Consequently, the collimated bundle produced by mirror 8 from the light passing out through the aperture in plate 74 is at only a small angle to the collimated bundle S" of FIG. 6 originating at the source 60. Hence for certain purposes a single set of calibration marks (not shown) on the elevation and windage adjustments may be usable with both sources. If desired however separate graduated scales may be provided for the two sources.

A hinged cover 76 may be provided to close off the aperture in plate 74 when the source 60 is to be employed.

It will thus be seen that, in embodiments of the invention which define an actual line of sight (as distinguished, say, from an aiming pattern in the form of a circle), the orientation of that line of sight is determined as the line joining the center of curvature of the concave mirror and the (substantially) point object which is imaged by the concave mirror 8 and which is located at or near the focal surface of that concave mirror, this object being imaged by that concave mirror at infinity in the form of a parallel bundle. In the embodiments of FIGS. 5 and 6, this substantially point object is the virtual image of the aperture in plate 66 formed by the reflective surface 63, that aperture constituting a real object of which the surface 63 forms a minified image. Thus in embodiments such as that of FIG. 5 employing image-forming means (surface 63) to present as object to the concave mirror a minified image of a real object, while it is desirable, it is not necessary that that real object be collinear with the center of curvature of the concave mirror and of those image-forming means, as is shown in FIG. 6.

FIG. 7 illustrates an embodiment of the invention which incorporates the structure of the embodiment of FIGS. 5 and 6 and, in addition, a convex reflecting toroidal surface 70. Conveniently, the surface 70 and the spherical surface 63 of the ball 62 of FIG. 6 are formed on a single integral body, of glass for example, silvered or otherwise coated, on the left-hand side in FIG. 7 to be reflective.

The spherical surface 63 and the concave mirror 8 in FIG. 7 cooperates with the source S constituted by the illuminated aperture in plate 66, just as in the embodiment of FIGS. 5 and 6, to develop a collimated beam indicated at S" parallel to the line joining the center of curvature C of the concave mirror 8 to the location of the virtual image of the source S produced by the spherical surface 63. The spherical surface 63, of radius r, has its center c located in FIG. 7 as in FIG. 6 at a distance r/2 toward the center of curvature C of the mirror 8 from the focal surface of that mirror. Again, the aperture in plate 66 and the centers c and C are advantageously collinear. The collimated beam S" is seen by the observer as a luminous dot, defining for him a line of sight which is parallel to the line joining the center of curvature C of the mirror 8 and the virtual image S' formed by surface 63 of the illuminated aperture in plate 66.

The toroidal surface 70 forms in addition, from the source S, a virtual image having substantially the shape of a circular line whose trace in the plane of FIG. 7 is indicated by the two points $S_1'$ and $S_2'$. This virtual image is then re-imaged by the concave mirror 8 as a conical continuum of parallel bundles which the eye in turn sees as a circle at infinity, concentrically disposed about a dot or point which is the image of the virtual object S'.

In one example of a construction according to FIG. 7, the toric surface 70 was generated by an arc of a circle of radius 0.03" rotated about an axis displaced 0.05" from the center of that circle. With a 4" focal length for the mirror 8, the resulting aiming circle presented to the user circumscribed, at 30 yards from the sight, an area about 0.75 yard in diameter, encompassing the shot pattern of a particular shotgun. That is to say, the virtual image presented to the mirror 8 by the spherical surface 63 and toroidal surface 70 comprised a substantially point image of the aperture in plate 66, formed by the spherical surface 63, surrounded by a circle substantially 0.1" in diameter. With a spherical mirror 8 of 4" focal length, i.e. of 8" radius of curvature, this circle subtended at that center an angle of $0.1/4 = 0.025$ radians or 1.4°. Hence the angular aperture of the conical array of collimated bundles, indicated in FIG. 7 by the angular separation of the bundles $S_1"$ and $S_2"$, was also 1.4°. At 30 yards from the gun the circle thus seen by the user would circumscribe an area $30 \times 0.025 = 0.75$ yards in diameter. On a shotgun whose shot pattern at, say, 30 yards from the muzzle is 0.75 yard in diameter, the aiming circle thus provided substantially circumscribes the shot pattern at that range.

Another embodiment of the invention is illustrated in FIGS. 8, 9 and 10. In this embodiment, the light source 60 and concave mirror 8 may be the same as in the embodiment of FIG. 5. Instead however of a ball presenting a convex reflective surface to the source so as to form a virtual image of that source for re-imaging at infinity by the concave mirror, the embodiment of FIGS. 8 to 10 employs as a second curved mirror a reflective surface 82 (FIG. 10) which is concave toward the source and which produces of the source a real image which in turn is imaged at infinity by the concave mirror.

Thus in FIG. 8, and as may be more clearly seen in the diagram of FIG. 10, there is provided in placeo f the ball 12 a rod 80 of transparent material, such as glass, having a spherical surface 82 on the lower end thereof, which is concave toward the light arriving from source 60, this surface being rendered reflecting by means of a silver or similar coating.

The embodiment of FIGS. 8 to 10 includes as an additional optical element a prism 84 whose function is to bend through an angle of the order of 90° the light passing from the source 60 to the rod 80 and from that rod to the concave mirror 8. For reduced effect of the prism on the light, it is provided with two plane faces 86 and 88 facing the source 60 and mirror 8, in addition to a plane face 90 and a plane reflecting face 92. The faces 86 and 88 are inclined to each other at a small angle of the order of 5 or 10° for example, selected so that the light passing from the source 60 into the prism enters approximately perpendicularly through the face 86 and so that the light returned from the concave reflecting face 82 passes from the prism 54 out substantially perpendicularly through the face 88 to the concave mirror 8. The rism 84 functions simply as a plane mirror, and is included for convenience in locating the rod and its range and windage adjustment mechanism, shown in FIG. 8.

In the embodiment of FIGS. 8 to 10, the rod 80, prism 84 and also the source 60 are located to position the image of that source, i.e. of the aperture in the plate 66, as formed in the reflecting face 92 and in the curved surface 82, on the focal surface of the mirror 8 as imaged in that reflecting face. The rod 80 is thus positioned so that its focal surface, i.e. the focal surface of its reflecting surace 82, substantially coincides, optically, with the focal surface of the mirror 8. That is to say, since the optical distance from source 60 to the reflecting surface 82, via the prism 84, is large compared to the radius of curvature $r$ of surface 82, the image of the source produced by that surface 82 lies substantially on the focal surface of that surface 82. This focal surface is, for a reflecting surface 82 of spherical shape and radius $r$, a spherical surface concentric with the surface 82 and of radius $r/2$. The portion of interest of the focal surface, where the real image of the source 60 is formed, lies within the rod 80.

In FIG. 10 the center of curvature of reflective surface 82 is indicated at $c$, and the focal surface of that surface is indicated by the dashed line 83. It is therefore on the surface 83 that the image of source 60 is formed. The image of the rod 80 and of its focal surface 83 in the prism face 92 are shown in dashed lines at 80' and 83', the images of the center $c$ and surface 82 in face 92 being identified at $c'$ and 82'. The rod and prism are so positioned as to locate the image 80' so that the focal surface 83' therein lies substantially on the focal surface of the mirror 8. The rod is advantageously cut with a face adjacent the prism substantially perpendicular to paths of light between the prism and the rod.

Like the ball of FIG. 5, the rod of FIGS. 8 to 10 produces a minified image of the light source 60. It is hence capable of providing to the user a very sharply-defined line of sight which is parallel to the line between the center of curvature of the mirror 8 and the image in the plane surface 92 of the substantially point-sized real image of the source 60 formed on the focal surface 83. That is to say, the image in the mirror 8 of that real image is a highly collimated bundle of light, perceived by the observer as a very sharply-defined luminous spot.

Referring now to FIG. 8, the glass rod 80 is supported in a sleeve 100 attached to the upper end of a stem 102, with a compression coil spring 104 engaged between a flange 106 at the lower end of the sleeve and an abutment surface in the mounting plate 6' of FIG. 8 which corresponds in function to the mounting plate 6 of FIG. 1.

For adjustment of the line of sight with reference to the axis of the gun barrel, the embodiment of FIGS. 8 to 10 employs screws which bear against the sleeve 100 in two perpendicular planes so as to flex the stem 102 and thereby move the rod 80. Of these screws one is seen at 108 in FIG. 8. The screw 108 is manipulated by means of a knob 110 and threadedly engages the housing or plate 6', thereby shifting the line of sight in the plane of FIG. 8 so as to make adjustments in elevation for various ranges. Windage adjustments are made by another screw which may be exactly similar to the screw 108 of FIG. 8 and which bears against the sleeve 100 in the vertical plane at right angles to that of FIG. 8. The knob 112 of this windage screw is seen in FIG. 9.

The embodiment of FIGS. 6 to 8 has the advantage that the reflecting surface on the glass rod 50 is protected by the glass itself since it is the concave side of the coating at 82 which performs the imaging function. The upper end of the rod 80 may of course accumulate foreign matter just as may the external reflecting surfaces 63 and 70 in the embodiments of FIGS. 5 to 7. This upper surface of the rod can however easily be located far from the focal surface 83, so as to have little deleterious effect upon the final image at infinity which is presented to the observer.

While the invention has been described hereinabove in terms of a number of presently preferred embodiments, the invention itself is not limited thereto. For example, the invention comprehends the use of refracting as well as reflecting surfaces for the formations of the minified images which are re-imaged at infinity by the concave mirror. More generally, the invention comprehends all modifications on and departures from the embodiments hereinabove described which properly fall within the spirit and scope of the appended claims.

I claim:

1. A sight comprising a partially transparent and partially reflecting first curved mirror, a second curved mirror disposed on the concave side of said first curved mirror with its focal surface substantially at the focal surface of the first curved mirror, and means defining a real object disposed at a distance from said second curved mirror large compared to the focal length of said second curved mirror, whereby said second curved mirror forms substantially at the focal surface of said first curved mirror a minified image of said object and whereby said first curved mirror forms at infinity an image of said minified image.

2. A sight according to claim 1 wherein said second curved mirror comprises a reflecting surface convex toward said object-defining means.

3. A sight according to claim 1 wherein said second curved mirror comprises a reflecting surface concave toward said object-defining means.

References Cited

UNITED STATES PATENTS

| | | | |
|---|---|---|---|
| 683,203 | 9/1901 | Grubb | 356—251 |
| 2,490,747 | 12/1949 | Creighton | 356—251 |
| 2,633,051 | 3/1953 | Davis | 356—251 |
| 2,780,130 | 2/1957 | Mauer | 356—251 |

RONALD L. WIBERT, Primary Examiner

O. B. CHEW II, Assistant Examiner

U.S. Cl. X.R.

350—294